(12) United States Patent
Maguire et al.

(10) Patent No.: US 10,619,701 B2
(45) Date of Patent: Apr. 14, 2020

(54) COMPACT HIGH FUNCTION DUAL MASS FLY WHEEL

(71) Applicant: BorgWarner Inc., Auburn Hills, MI (US)

(72) Inventors: Joel M. Maguire, Hartland, MI (US); Michael Schwekutsch, Palo Alto, CA (US); Marco Valentin Kachler, Walldorf (DE)

(73) Assignee: BorgWarner Inc., Auburn Hills, MI (US)

( * ) Notice: Subject to any disclaimer, the term of this patent is extended or adjusted under 35 U.S.C. 154(b) by 201 days.

(21) Appl. No.: 15/564,062

(22) PCT Filed: Apr. 4, 2016

(86) PCT No.: PCT/US2016/025835
§ 371 (c)(1),
(2) Date: Oct. 3, 2017

(87) PCT Pub. No.: WO2016/164294
PCT Pub. Date: Oct. 13, 2016

(65) Prior Publication Data
US 2018/0094694 A1    Apr. 5, 2018

Related U.S. Application Data

(60) Provisional application No. 62/145,936, filed on Apr. 10, 2015.

(51) Int. Cl.
*F16D 25/10* (2006.01)
*F16F 15/133* (2006.01)
(Continued)

(52) U.S. Cl.
CPC .............. *F16F 15/133* (2013.01); *F16D 3/12* (2013.01); *F16D 25/0638* (2013.01);
(Continued)

(58) Field of Classification Search
CPC ....... F16H 15/133; F16H 15/145; D16D 3/12; D16D 25/10; D16D 25/0638; D16D 2300/22
See application file for complete search history.

(56) References Cited

U.S. PATENT DOCUMENTS

| | | | |
|---|---|---|---|
| 2003/0066728 A1* | 4/2003 | Hirt | F16D 21/06 192/48.8 |
| 2003/0168302 A1* | 9/2003 | Diemer | F16D 25/10 192/48.1 |

(Continued)

FOREIGN PATENT DOCUMENTS

JP    2013512391 A    4/2013

OTHER PUBLICATIONS

International Search Report and Written Opinion; dated Jul. 14, 2016; for International Application No. PCT/US2016/025835; 15 pages.

*Primary Examiner* — David J Hlavka
(74) *Attorney, Agent, or Firm* — BrooksGroup

(57) ABSTRACT

The present invention generally relates to a vehicle system which may include a primary clutch operably coupled with a primary inertia, and a torsional spring operably coupled with the primary inertia and also operably coupled to a transmission input shaft. The transmission input shaft may be operably coupled to a secondary clutch which may be constructed and arranged to engage a secondary inertia. The secondary inertia may be used to deliver a dual mass fly wheel effect and the secondary clutch may be constructed and arranged to be opened during shifting events.

15 Claims, 3 Drawing Sheets

(51) Int. Cl.
*F16D 3/12* (2006.01)
*F16D 25/0638* (2006.01)
*F16F 15/14* (2006.01)

(52) U.S. Cl.
CPC ............ *F16D 25/10* (2013.01); *F16F 15/145* (2013.01); *F16D 2300/22* (2013.01)

(56) References Cited

U.S. PATENT DOCUMENTS

| | | |
|---|---|---|
| 2006/0185959 A1 | 8/2006 | Tsuruta et al. |
| 2007/0037659 A1* | 2/2007 | Bailey .................... F16D 25/10 475/296 |
| 2013/0020167 A1 | 1/2013 | Krebs et al. |
| 2014/0097051 A1* | 4/2014 | Moore .................. F16D 65/123 188/218 XL |
| 2014/0151181 A1 | 6/2014 | Reimnitz |
| 2014/0216879 A1* | 8/2014 | Gerdeman ............ F16F 15/145 192/3.28 |
| 2015/0362053 A1* | 12/2015 | Kawahara ............... F16H 45/02 60/330 |

\* cited by examiner

COMPACT HIGH FUNCTION DUAL MASS FLY WHEEL

CROSS-REFERENCE TO RELATED APPLICATIONS

This application claims the benefit of U.S. Provisional Application No. 62/145,936 filed Apr. 10, 2015.

TECHNICAL FIELD

The field to which the disclosure generally relates to includes vehicle systems including vehicle operating systems.

BACKGROUND

Vehicles include various operating systems.

SUMMARY OF ILLUSTRATIVE VARIATIONS

A number of variations may include a vehicle system which may include a primary clutch operably coupled with a primary inertia. A torsional spring may be operably coupled with the primary inertia and may be also operably coupled to a transmission input shaft. The transmission input shaft may be operably coupled to a secondary clutch and may be constructed and arranged to engage a secondary inertia. The secondary inertia may be used to deliver a dual mass fly wheel effect and the secondary clutch may be opened during shift events.

A number of other variations may include a system which may have a torsional spring which may be operably coupled with the primary inertia and may also be operably coupled to a transmission input shaft. The transmission input shaft may be operably coupled to a secondary clutch which may be constructed and arranged to engage a secondary inertia. The secondary inertia may be used to deliver a dual mass fly wheel effect and the secondary clutch may be constructed and arranged to be open during shift events. The primary inertia may be operably coupled with a permanently engaged starter device. A number of other variations may include a method which may include first engaging a primary clutch with a primary inertia. A torsional spring may be operably coupled with the primary inertia and a transmission input shaft. The transmission input shaft may be operably coupled to a secondary clutch. The secondary clutch may be engaged with the secondary inertia and the secondary inertia may be used to deliver a dual mass fly wheel effect. Next, the secondary clutch is open during shifting events. Finally, the primary clutch may be opened during high speed travel.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
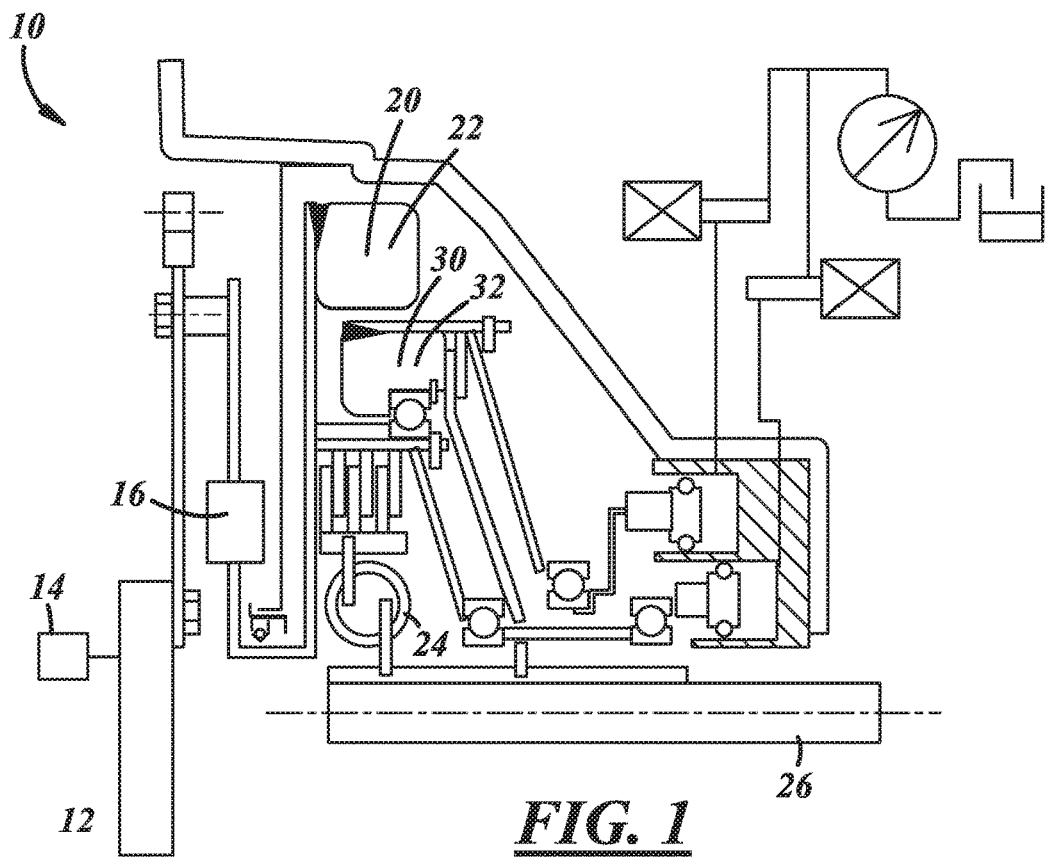
FIG. 1 shows a schematic illustration of a vehicle system according to a number of variations.

Referring to the variation illustrated in FIG. 1, the vehicle system 10 may include an engine crank shaft 12 which may be operably coupled to a vehicle engine 14. The engine crank shaft 12 may be a standard crank shaft as known by one of ordinary skill in the art. It is also contemplated that the engine crank shaft 12 may be any other shaft as known by one of ordinary skill. The engine crank shaft 12 may be operably coupled to a permanently engaged starter 16. The permanently engaged starter 16 may be constructed and arranged to allow the vehicle engine 14 to be shut down and restarted automatically upon the completion of a preset criteria in order to deliver improved fuel economy.

The permanently engaged starter 16 may be operably coupled to a primary clutch 20 which may be nested with a primary inertia 22. The primary clutch 20 may be a standard clutch as known by one of ordinary skill in the art. Additionally, it is contemplated that the primary inertia 22 may be operably coupled directly to the engine crank shaft 12. The primary inertia 22 may be a standard inertia as known by one of ordinary skill in the art. Moreover, the primary clutch 20 may additionally be operably coupled to a spring 24. The spring 24 may be a torsional spring or any other spring as known by one of ordinary skill in the art.

Moreover, the spring 24 may have an output which may be operably coupled to a transmission input shaft 26. The transmission input shaft 26 may be a standard shaft or any other shaft as known by one of ordinary skill in the art. Moreover, the transmission input shaft 26 may also be operably coupled to a second clutch 30. The secondary clutch 30 may also be constructed and arranged to selectively engage a secondary inertia 32. For example, the secondary clutch 30 may be opened during shift events and may be constructed and arranged to disengage with the secondary inertia 32 in order to insure that the transmission synchronizers do not have to synchronize the secondary inertia 32.

Under normal operation, the secondary inertia 32 may be used as a secondary mass in order to deliver a dual mass fly wheel effect. The dual mass fly wheel effect may be an isolation and natural frequency shift from the driving range. It is also contemplated that the vehicle system 10 may allow the secondary inertia 32 to be disengaged during WOT maneuvers. Allowing the secondary inertia 32 to be engaged and disengaged based on preset criteria or user input may result in improved fuel economy along with improved vehicle performance.

Additionally, it is also contemplated that the primary clutch 20 may be automatically controlled in order to deliver expanded engine stop/start operation. Specifically, a vehicle transmission may not have to be in neutral in order to enable engine shut down. As such, the primary clutch 20 may be constructed and arranged to be opened during driving situations where the vehicle is moving at relatively high speeds, and/or the driver is at or near a zero pedal position. This may allow the engine 14 to shut down and be restarted automatically or based on user input in order to deliver improved fuel economy. Moreover, as illustrated in the variation shown in FIG. 1, the vehicle system 10 may include at least one and possibly two actuators. It is contemplated that at least one of the actuators will disconnect from the secondary inertia 32 upon completion of a preset criteria, or upon user activation.

Figure 2:
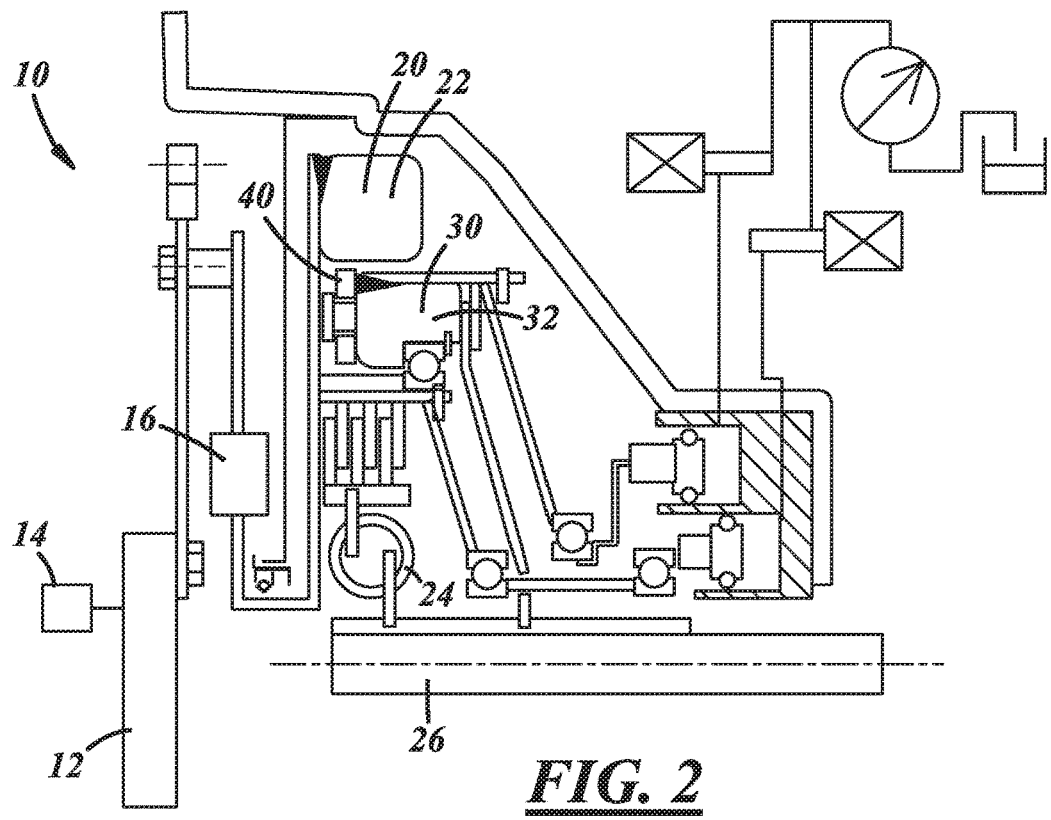
FIG. 2 shows another schematic illustration of a vehicle system according to a number of variations.

Referring now to the variation illustrated in FIG. 2, the variation shown in FIG. 2 may have many similar features as described above with respect to FIG. 1. Specifically, the vehicle system 10 illustrated in FIG. 2 may include the engine crank shaft 12, the transmission input shaft 26, the permanently engaged starter 16 along with the primary and secondary clutches 20, 30 corresponding with the primary and secondary inertias 22, 33. Moreover, the variation illustrated in FIG. 2 may further include a centrifugal pendulum 40.

It is contemplated that the one or more of the primary and secondary clutches 20, 30 may be a pneumatic clutch. The pneumatic clutch may be powered by compressed air. Additionally, the pneumatic clutch may be constructed and arranged to transfer power from one part of the vehicle system to another part of the vehicle system. In operation, upon pneumatic clutch disengagement, an air valve may be opened and air flow may be initiated through an aperture which may open the clutch. During reengagement, the air may be bled out of the system and the clutch may reattach to the corresponding inertia. It is also contemplated that the primary and secondary clutches 20, 30 may be mechanical clutches or other types of clutches as known by one of ordinary skill in the art.

Figure 3:
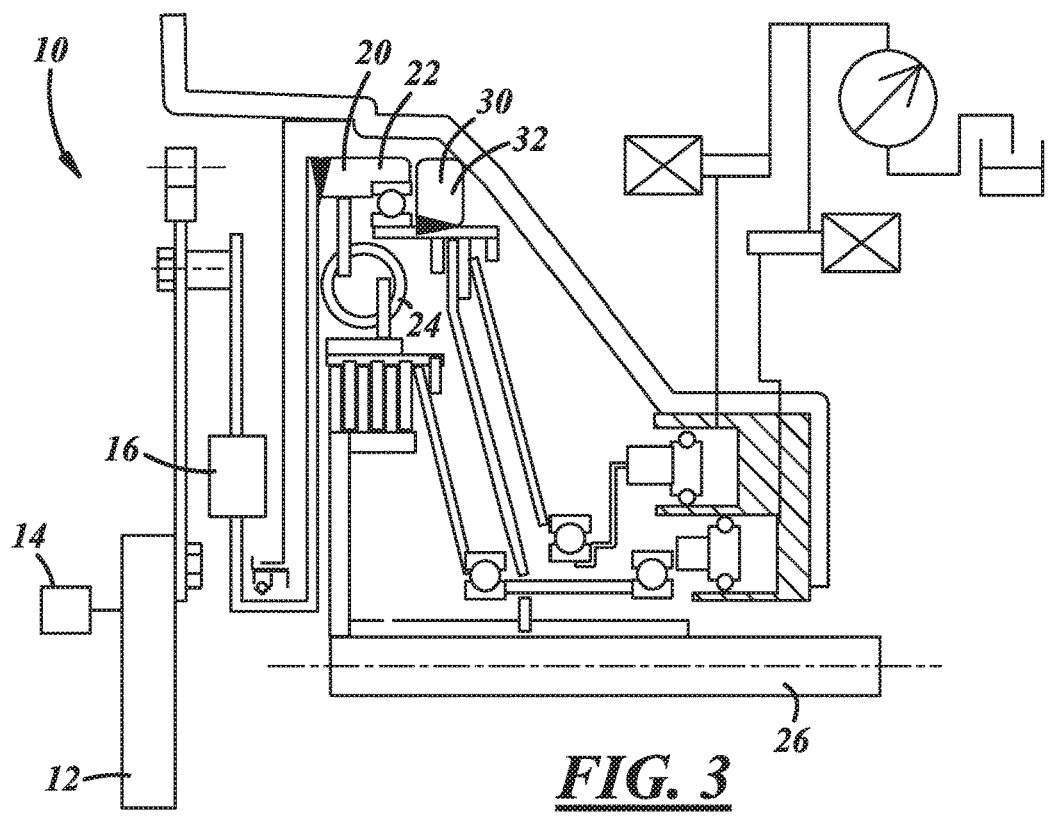
FIG. 3 shows yet another schematic illustration of a vehicle system according to a number of variations.

Referring now to the variation illustrated in FIG. 3, the variation in FIG. 3 may include many similar features as described above with respect to FIG. 1 including the engine crank shaft 12, the permanently engaged starter 16 which may be operably coupled with the primary and secondary clutches 20, 30 and the primary and secondary inertias 22, 32. The variation illustrated in FIG. 3 may also operate to deliver a dual mass fly wheel effect. As illustrated in the variation shown in FIG. 3, the spring 24 may have a larger diameter than the primary clutch 20. It is also contemplated that the spring 24 may have a diameter which is larger than the secondary clutch 30. Moreover, the secondary inertia 32 may have a larger diameter than the primary inertia 22, as illustrated in the variation shown in FIG. 3. As additionally illustrated in FIG. 3, it is contemplated that the secondary clutch 30 may have a larger diameter than the primary clutch 20.

Figure 4:
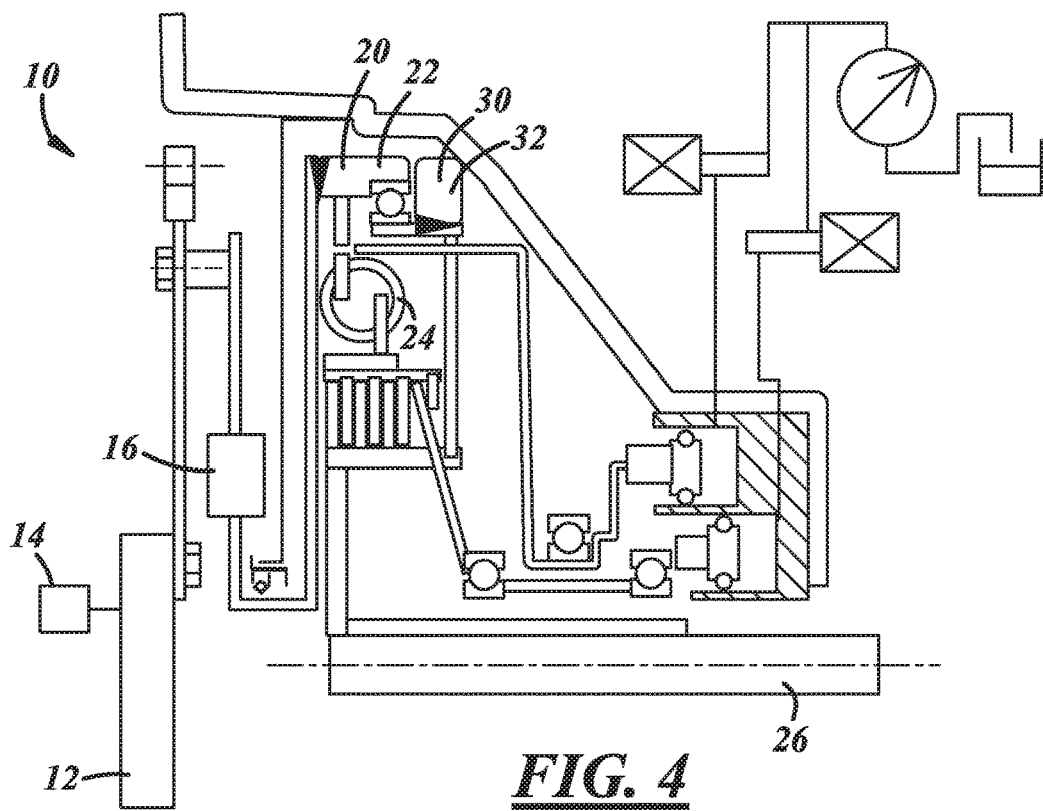
FIG. 4 shows another schematic illustration of a vehicle system according to a number of variations.

Referring now to the variation illustrated in FIG. 4, the variation illustrated in FIG. 4 may include many similar features as described above with respect to FIG. 1 including but not limited to the engine crank shaft 12, the permanently engaged starter 16 which may be operably coupled to a primary and secondary inertias 22, 32 along with the primary and secondary clutches 20, 30. Additionally, the variation illustrated in FIG. 4 may include the transmission input shaft 26 and the spring 24 which may operably couple the transmission input shaft 26 to the primary and secondary clutches 20, 30. Moreover, during operation of the variation illustrated in FIG. 4, the primary clutch 20 and a damper may lock together. It is contemplated that the damper may be tuned only for other drive cases. It is also contemplated that the damper may be tuned as known by one of ordinary skill in the art.

Figure 5:
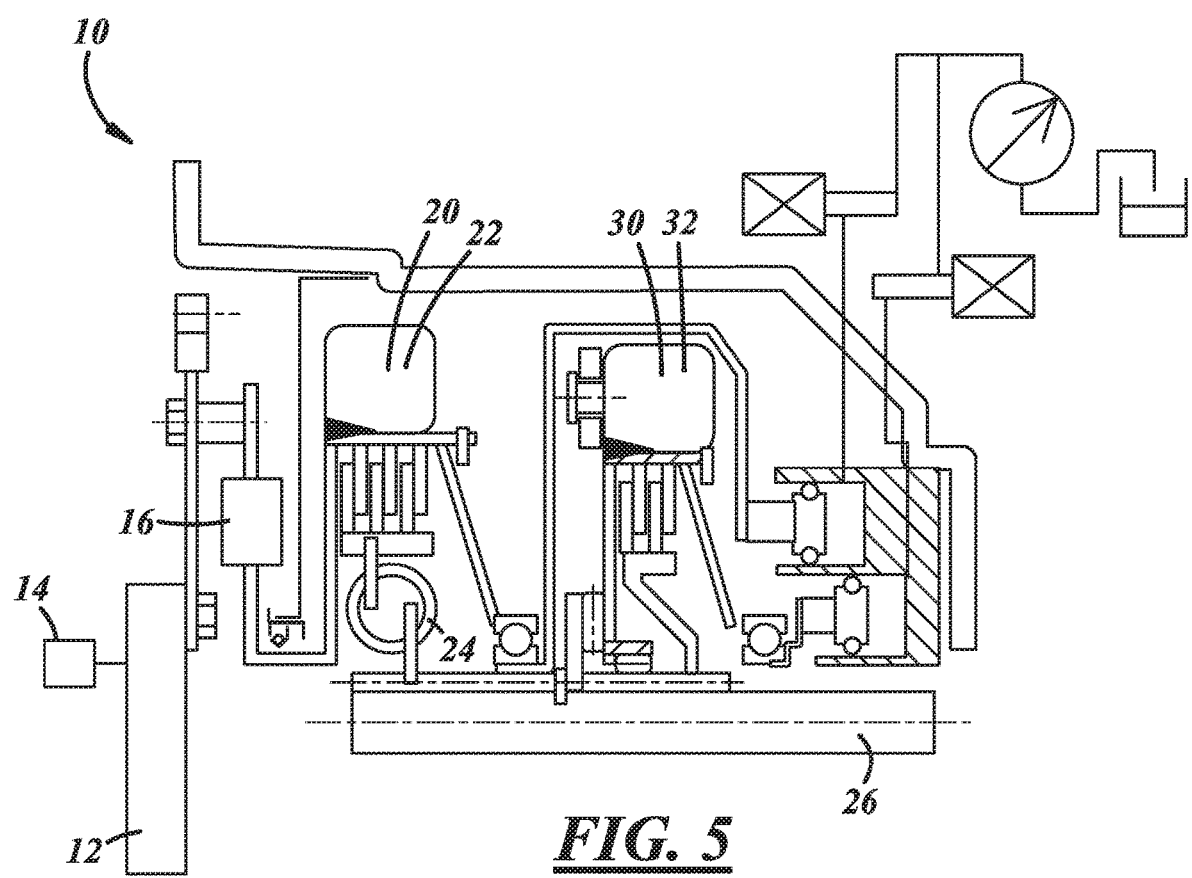
FIG. 5 shows yet another schematic illustration of a vehicle system according to a number of variations.

Referring now to the variation illustrated in FIG. 5, the vehicle system 10 may include many similar features as described above with respect to FIG. 1 including but not limited to the engine crank shaft 12, the permanently engaged starter 16, the primary and secondary clutches 20, 30 along with the primary and secondary inertias 22, 32, the spring 24, and the transmission input shaft 26. Moreover, the vehicle system 10 may include at least one solenoid operably coupled to the secondary inertia 32. Moreover, it is contemplated that at least one of the solenoids may operate in any rotation direction including clockwise and counter-clockwise directions. Additionally, multiple solenoids may rotate in reverse directions simultaneously or consecutively.

Referring now to the variations shown in FIGS. 1-5, the vehicle system 10 may include a wet clutch approach or a dry clutch approach as known by one of ordinary skill in the art. The secondary inertia 32 may be decoupled from the secondary clutch 30 during 0 to 60, and/or during vehicle shifts in an effort to keep shift effort low. The vehicle system 10 may further include the centrifugal pendulum as known by one of ordinary skill in the art. Moreover, the primary and secondary clutches 20, 30 may be constructed and arranged to be welded in the vehicle system 10. It is also contemplated that the primary and secondary clutches 20, 30 may be attached to the vehicle system in another way as known by one of ordinary skill in the art. Moreover, it is contemplated that the permanently engaged starter 16 may be optionally within the vehicle system 10.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a vehicle system which may include a primary clutch which may be operably coupled with the primary inertia. Additionally, a torsional spring may be operably coupled with the primary inertia and to a transmission input shaft. The transmission input shaft may be operably coupled to the secondary clutch which may be constructed and arranged to engage a secondary inertia. Moreover, the secondary inertia may be used to deliver a dual mass fly wheel effect and the secondary clutch may be opened during shift events.

Variation 2 may include a vehicle system as set forth in Variation 1 which may further include a centrifugal pendulum.

Variation 3 may include a method as set forth in any of Variations 1-2 and may further include a crank shaft which may be operably coupled with the primary inertia.

Variation 4 may include the vehicle system as set forth in any of Variations 1-3 wherein the primary clutch may be opened during high speed travel.

Variation 5 may include the vehicle system as set forth in any of Variations 1-4 wherein the primary clutch may be opened when the driver is at or near a zero pedal position.

Variation 6 may include the vehicle system as set forth in any of Variations 1-5 wherein the secondary clutch may be disengaged from the secondary inertia during WOT maneuvers.

Variation 7 may include the vehicle system as set forth in any of Variations 1-6 and may further include at least one actuator.

Variation 8 may include the vehicle system as set forth in any of Variations 1-7 wherein the secondary inertia may have a larger diameter than the primary inertia.

Variation 9 may include a system which may include a torsional spring which may be operably coupled with a primary inertia and also may be operably coupled with a transmission input shaft. The transmission input shaft may be operably coupled to a secondary clutch which may be constructed and arranged to engage a secondary inertia. The secondary inertia may be used to deliver a dual mass fly wheel effect and the secondary clutch may be constructed and arranged to be open during shift events. Moreover, the primary inertia may be operably coupled with a permanently engaged starter device.

Variation 10 may include the system as set forth in Variation 9 and may further include a centrifugal pendulum.

Variation 11 may include the system as set forth in any of Variations 9-10 and may further include a crank shaft which may be operably coupled with the primary inertia.

Variation 12 may include the system as set forth in any of Variations 9-11 wherein the primary clutch may be opened during high speed travel.

Variation 13 may include the system as set forth in any of Variations 9-12 wherein the primary clutch may be opened when the driver is at or near a zero pedal position.

Variation 14 may include the system as set forth in any of Variations 9-13 wherein the secondary clutch may be opened during WOT maneuvers.

Variation 15 may include a method which may include first engaging a primary clutch with a primary inertia along with providing a torsional spring which may be operably coupled with the primary inertia and a transmission input shaft. The transmission input shaft may be operably coupled to a secondary clutch. The secondary clutch may be engaged with the secondary inertia and the secondary inertia may be used to deliver a dual mass fly wheel effect. Next, the secondary clutch may be opened during shifting events and the primary clutch may be opened during high speed travel.

Variation 16 may include the method as set forth in Variation 15 and may further include a crank shaft which may be operably coupled with the primary inertia.

Variation 17 may include the method as set forth in any of Variations 15-16 wherein the secondary inertia may have a larger diameter than the primary inertia.

Variation 18 may include the method as set forth in any of Variations 15-17 and may further include a centrifugal pendulum.

Variation 19 may include the method as set forth in any of Variations 15-18 wherein the primary clutch may be opened when the driver is at or near a zero pedal position.

Variation 20 may include the method as set forth in any of Variations 15-19 wherein the primary clutch may be welded.

The above description of select variations within the scope of the invention is merely illustrative in nature and, thus, variations or variants thereof are not to be regarded as a departure from the spirit and scope of the invention.

What is claimed is:

1. A vehicle system comprising:
   a primary clutch operably coupled with a primary inertia;
   a torsional spring operably coupled with the primary inertia and to a transmission input shaft;
   wherein the primary inertia is coupled directly to an engine crank shaft;
   wherein the transmission input shaft is operably coupled to a secondary clutch constructed and arranged to engage a secondary inertia; and
   wherein the secondary inertia is used to deliver a dual mass fly wheel effect and the secondary clutch is opened during shift events.

2. The vehicle system of claim 1, further comprising a centrifugal pendulum.

3. The vehicle system of claim 1, wherein the primary clutch is opened during high speed travel.

4. The vehicle system of claim 2, wherein the primary clutch is opened when a driver is at or near a zero pedal position.

5. The vehicle system of claim 1, further including at least one actuator.

6. The vehicle system of claim 1, wherein the secondary inertia has a larger diameter than the primary inertia.

7. A system comprising:
   a torsional spring operably coupled with a primary inertia and to a transmission input shaft;
   wherein the transmission input shaft is operably coupled to a secondary clutch constructed and arranged to engage a secondary inertia;
   wherein the primary inertia is coupled directly to an engine crank shaft;
   wherein the secondary inertia is used to deliver a dual mass fly wheel effect and the secondary clutch is constructed and arranged to be opened during shift events; and
   wherein the primary inertia is operably coupled with a permanently engaged starter device.

8. The system of claim 7, further comprising a centrifugal pendulum.

9. The system of claim 7, wherein the primary clutch is opened during high speed travel.

10. The system of claim 7, wherein the primary clutch is opened when a driver is at or near a zero pedal position.

11. A method comprising:
    engaging a primary clutch with a primary inertia;
    providing a torsional spring operably coupled with the primary inertia and a transmission input shaft, and wherein the transmission input shaft is operably coupled to a secondary clutch;
    wherein the primary inertia is coupled directly to an engine crank shaft;
    engaging the secondary clutch with a secondary inertia, wherein the secondary inertia is used to deliver a dual mass fly wheel effect;
    opening the secondary clutch during shifting events; and
    opening the primary clutch during high speed travel.

12. The method of claim 11, wherein the secondary inertia has a larger diameter than the primary inertia.

13. The method claim 11, further comprising a centrifugal pendulum.

14. The method of claim 11, wherein the primary clutch is opened when a driver is at or near a zero pedal position.

15. The method of claim 11, wherein the primary clutch is welded.

* * * * *